United States Patent [19]
White

[11] Patent Number: 4,915,334
[45] Date of Patent: Apr. 10, 1990

[54] CAPTIVE NUT BASE ADJUSTING DEVICE
[75] Inventor: O. Timothy White, Carnesville, Ga.
[73] Assignee: Royston Corporation, Royston, Ga.
[21] Appl. No.: 387,509
[22] Filed: Jul. 28, 1989
[51] Int. Cl.$^4$ .............................................. A47B 91/02
[52] U.S. Cl. .................................................. 248/188.4
[58] Field of Search .................. 248/677, 188.2, 188.4, 248/188.9, 688, 649, 650, 188.8, 669; 411/174, 175, 965, 999; 52/126.4, 126.6, 126.7

[56]         References Cited
         U.S. PATENT DOCUMENTS

| | | | |
|---|---|---|---|
| 1,173,695 | 2/1916 | Wooley | 248/188.4 |
| 1,394,338 | 10/1921 | Nyman | 248/188.2 |
| 1,482,205 | 1/1924 | Uhl | 248/188.9 |
| 2,683,576 | 7/1954 | Miller | 248/677 |
| 2,725,667 | 12/1955 | Ingarra | 16/19 |
| 2,881,876 | 4/1959 | Williams | 52/126.4 |
| 3,653,341 | 4/1972 | Nielsen | 248/188.4 |
| 4,676,706 | 6/1987 | Inaba | 411/175 |
| 4,716,841 | 1/1988 | Suttles | 248/243 |
| 4,755,090 | 7/1988 | Macfee, Jr. | 411/174 |

FOREIGN PATENT DOCUMENTS 891875  3/1962  United Kingdom ............. 248/188.4

*Primary Examiner*—Ramon O. Ramirez
*Assistant Examiner*—Robert A. Olson
*Attorney, Agent, or Firm*—Howson & Howson

[57]        ABSTRACT

In an article of furniture, a captive nut base adjustment device is used for height and leveling adjustment. The device comprises a C-shaped retainer for captively holding a nut in contact with a horizontal flange of a base beam attached to the article of furniture. The nut receives a threaded shank of an adjustable foot. The shank extends through aligned holes in the flange and the retainer. The retainer and base beam include a T-shaped plate and an L-shaped slot which cooperate to prevent the nut and retainer from being removed while the nut is in place, and which permit removal of the retainer when the nut is not in place. The furniture can be painted before the nut, retainer and foot are attached, thereby preventing paint from contacting the threads of the nut. After painting, the retainer, nut, and foot are easily attached and adjusted. The retainer and beam are designed with vertical surfaces forming a pocket for receiving the nut and holding it in alignment with holes in the flange and retainer.

10 Claims, 2 Drawing Sheets

CAPTIVE NUT BASE ADJUSTING DEVICE

BRIEF SUMMARY OF THE INVENTION

This invention relates to a height and leveling adjustment device for use in connection with various articles of furniture and the like, for example shelving units of the kind shown and described in commonly owned U.S. Pat. No. 4,716,841, issued Jan. 5, 1988 to James M. Suttles. The entire disclosure of U.S. Pat. No. 4,716,841 is hereby incorporated by reference.

An example of the various leveling devices known heretofore is described in U.S. Pat. No. 2,725,667, issued Sept. 16, 1954 to N. Ingarra. These devices comprise a substantially flat base member provided with a screw threaded vertical hole extending therethrough. The base member is rigidly and permanently secured to the base of an article of furniture, and a screw threaded shank of a foot is threaded through the hole for leveling.

With leveling devices of the type described, problems arise when the article of furniture is to be painted since paint will adhere to the leveling device and to the threads of the vertical hole. Paint adhesion to the threads makes it difficult if not impossible to insert the screw threaded foot for leveling and height adjustment. Further, painting over the leveling device with the shank of the foot threaded through the vertical hole makes adjustment difficult since paint will adhere to the threads of the threaded shank.

The principal object of this invention is to provide a height-adjusting and leveling device for an article of furniture which allows the article of furniture to be painted without any fear of getting paint in the threads which receive the threaded shank of the adjustable foot.

A further object of the invention is to provide a height-adjusting and leveling device the threaded parts of which are separable from the article of furniture, but easily and securely attached thereto.

In accordance with the instant invention, these objects are addressed by a height adjusting and leveling device in which a captive nut is removably secured to a horizontal flange by a retainer which is locked in position when the nut is present between one element of the retainer and the flange. The article of furniture is provided with a base beam having a horizontal flange having a vertical hole. The retainer has substantially parallel plates for captively holding the nut in contact with either the upper or lower surface of the horizontal flange. The nut is provided with a threaded hole which is aligned with the hole of the horizontal flange. In addition, the retainer includes holes in each of the two plates which, when aligned with the hole of the horizontal flange and the threaded hole of the nut, allow the insertion of a threaded shank of an adjustable foot through the threaded hole of the nut and through the other three holes. The retainer and base beam have cooperating means so the retainer and nut cannot be removed when the nut is in place. When the nut is not in place, the retainer is removable.

This invention substantially improves the ability to paint articles of furniture without impairing the ability to adjust the height or leveling of the furniture after painting. Additionally, this invention provides a height-adjusting and leveling device which can easily be removed from the article of furniture while providing a secure attachment thereto when in use.

DETAILED DESCRIPTION

Figure 1:
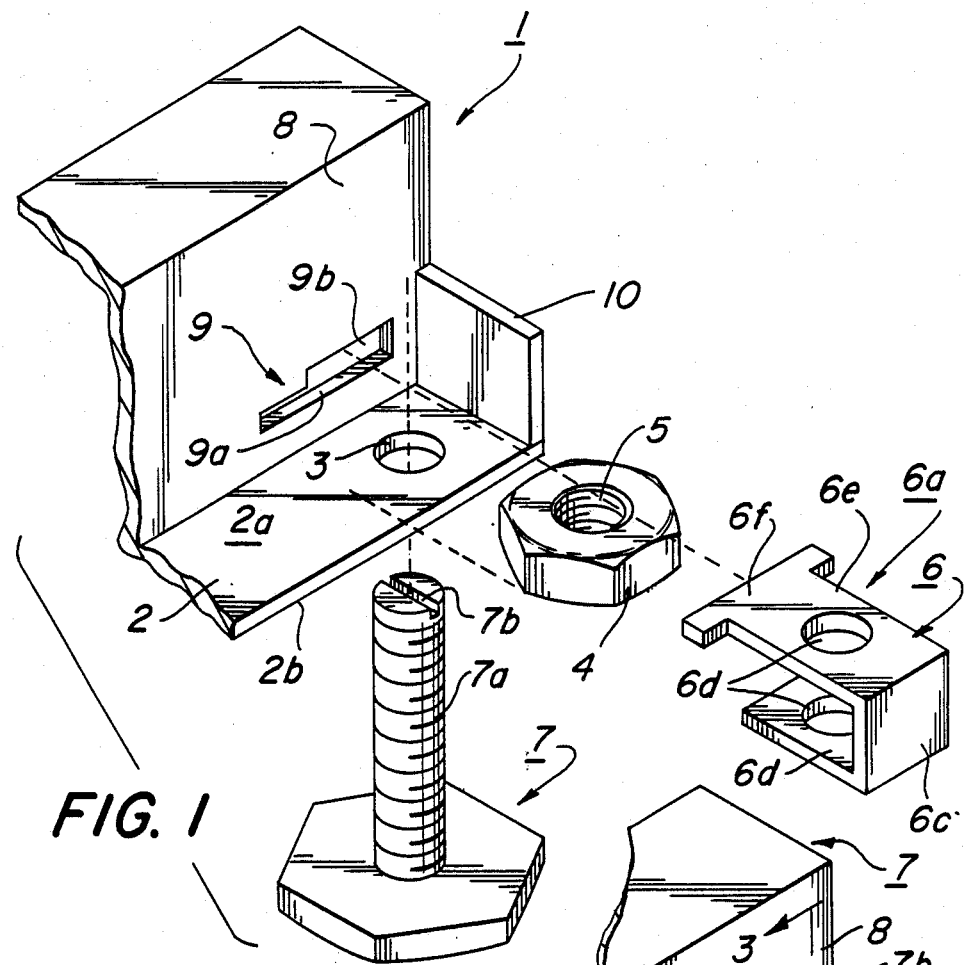
FIG. 1 is an exploded perspective view of a captive nut base adjusting device in accordance with the invention.

Referring to FIG. 1, the captive nut base adjustment device includes a base beam 1 which is rigidly secured to the base of an article of furniture (not shown) such as the shelving unit of U.S. Pat. No. 4,716,841 issued Jan 5, 1988 to James M. Suttles.

Base beam 1, preferably a Z-shaped element formed of sheet steel, comprises a horizontal flange 2 having upper and lower surfaces 2a and 2b, respectively. Base beam 1 further comprises a vertical member 8 preferably extending upwardly from one of the long edges of the horizontal flange 2. The flange 2 and vertical member 8 are provided at their ends with a vertical reinforcing plate 10. Formed in flange 2 is a vertically extending non-threaded hole 3 for receiving the threaded shank 7a of adjustable foot 7. Vertical member 8 has formed therethrough a horizontally extending slot 9 for receiving and holding plate 6a of retainer 6. Slot 9 is formed to have a wide portion 9a located nearest horizontal flange 2 and a narrow portion 9b located remote from flange 2.

Figure 3:
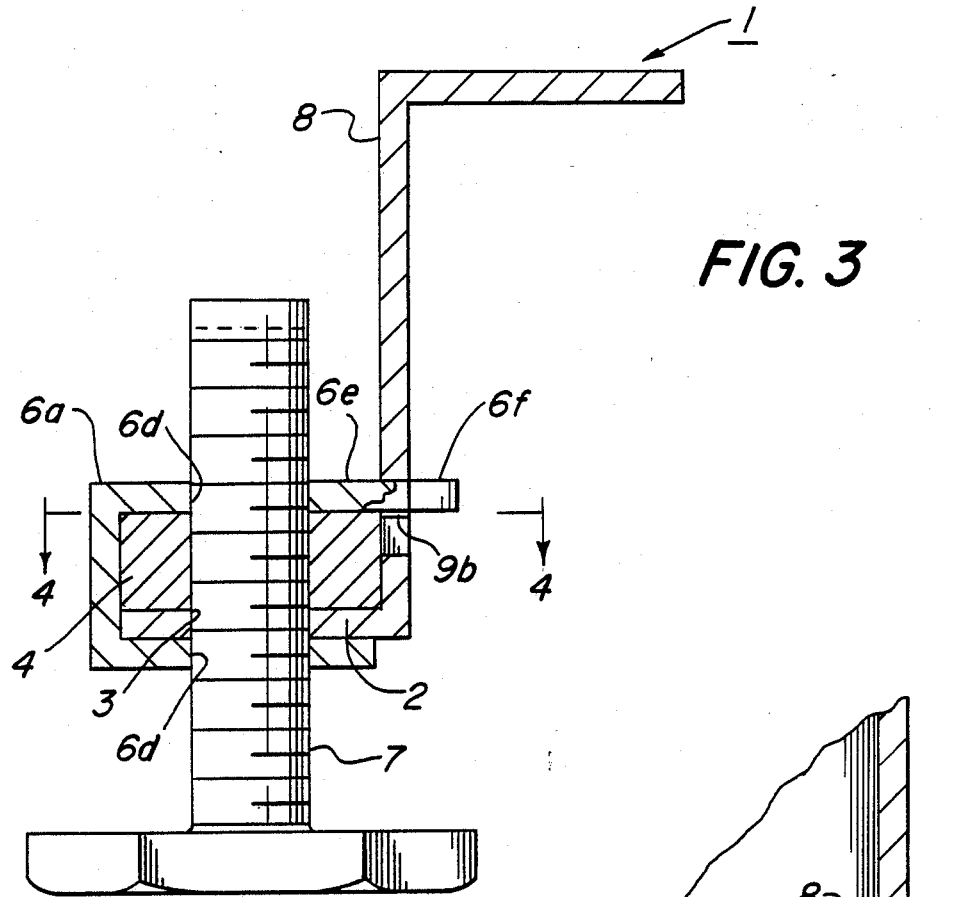
FIG. 3 is a vertical section taken along the surface 3—3 of FIG 2.

The retainer 6 is preferably a C-shaped retainer formed of sheet steel and comprises two substantially parallel plates 6a and 6b held in a rigid, spaced relationship to each other by a web 6c. The plates have aligned holes 6d formed therethrough for receiving threaded shank 7a of foot 7. A nut 4, preferably a hexagonal nut, or of another shape having at least one pair of parallel opposed sides, is positioned between the upper surface 2a of the flange, and the lower surface of the upper plate 6a of the retainer. The distance between plates 6a and 6b is substantially equal to the sum of the thicknesses of horizontal flange 2 and nut 4. As shown in FIG. 3, maintaining such distance between the plates ensures that nut 4 is captively held in place in a snug fashion.

Plate 6a is T-shaped, being formed with a narrow portion 6e extending from web 6c, and a wide portion 6f at the end of plate 6a remote from the web. The wide portion 6f cooperates with slot 9 formed in vertical member 8 to hold the retainer in place when the nut 4 is present. The wide portion 6f of plate 6a passes through the wide portion 9a of slot 9 when nut 4 is not in place. The narrow portion 9b of slot 9 prevents plate 6a from being pulled out of slot 9 when nut 4 is in place because the nut prevents the wide portion 6f from moving into register with wide portion 9a of the slot. While plate 6a is preferably T-shaped, and slot 9 is preferably L-shaped, it will be appreciated by those skilled in the art that plate 6a and slot 9 can take various alternative shapes as long as the narrow portion 6e of plate 6a is capable of fitting through the narrow portion 9b of slot 9 and the wide portion 6f of the plate 6a is capable of entering the wide portion 9a of slot 9 but incapable of passing through narrow portion 9b.

Figure 2:
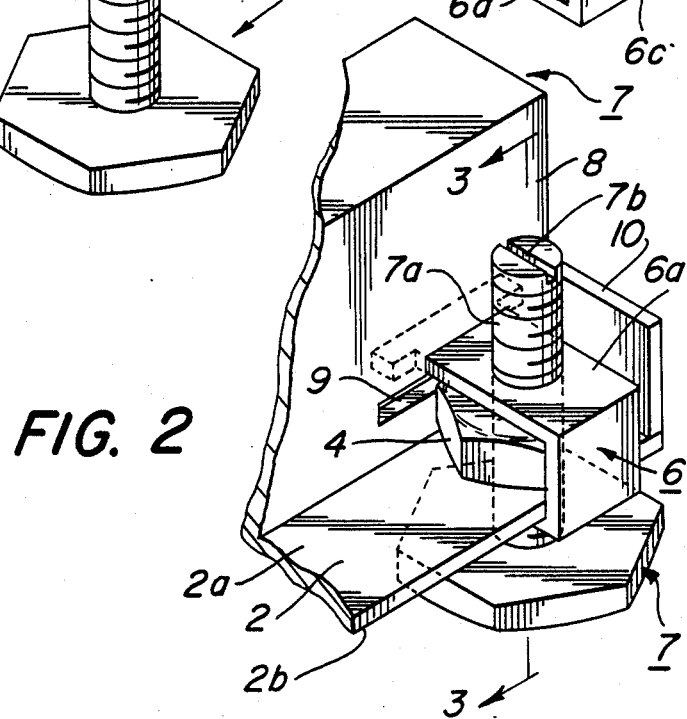
FIG. 2 is a perspective view of the invention as assembled.

Referring to FIGS. 1 and 3, the device shown in FIG. 2, can be assembled in the following manner. The retainer 6 is positioned on flange 2 with its plate 6a above the flange and its plate 6b below the flange. The wide portion 6f of plate 6a is inserted through the wide portion 9a of slot 9. Holes 6d of retainer 6 are then aligned with hole 3 of horizontal flange 2. The retainer 6 is then moved in an upward direction in order to bring the lower plate of retainer 6 in contact with the lower surface 2b of horizontal flange 2. This also moves plate 6a upwardly so that its narrow portion 6e fits into the narrow portion 9b of slot 9. Retainer 6 is held in this upward position while nut 4 is inserted laterally into the space between the upper surface 2a of horizontal flange 2 and the underside of plate 6a of retainer 6. The nut is positioned so that threaded hole 5 is aligned with holes 6d and hole 3, providing a clear path for threaded shank 7a of foot 7 to be inserted therethrough and threaded into hole 5 of nut 4.

Figure 4:
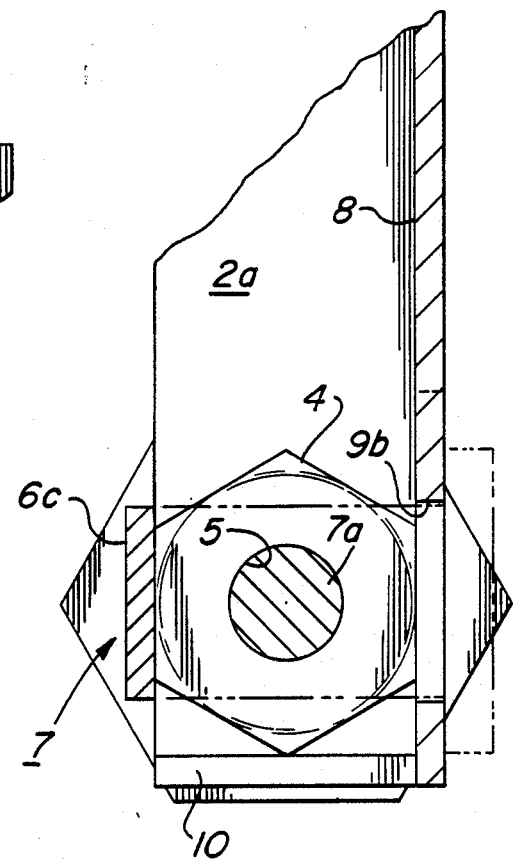
FIG. 4 is a horizontal section taken along surface 4—4 of FIG. 3.

Desirably, the width of the upper surface 2a of flange 2 is equal to the distance between opposed sides of nut 4, and the distance between the center of hole 3 (FIG. 1) and reinforcing plate 10 is equal to 0.577 times the distance between the opposed vertical sides of nut 4. Thus, as shown in FIG. 4, when the nut is pushed underneath the retainer, its threaded hole 5 automatically assumes alignment with the hole in the flange and the holes in the upper and lower plates of the retainer.

Height and leveling adjustment can easily be carried out by inserting a screwdriver into slot 7b provided on the end of threaded shank 7a and turning shank 7a to provide the adjustment. Captively holding nut 4 in place with retainer 6, as shown in FIG. 4, allows threaded shank 7a to be adjusted without imparting rotation on the nut.

The invention, as above-described, allows the article of furniture to be painted and even repainted without getting paint into the threads of the nut. Prior to repainting the article of furniture, nut 4 is removed from the space between retainer 6 and horizontal flange 2. This allows retainer 6 to be removed from slot 9. The article of furniture and base beam 1 can be then repainted whereafter nut 4 and retainer 6 are returned to their previous positions for assembly. The invention also provides for easy and secure assembly of the adjusting device and for simple manufacture thereof.

Numerous modifications and variations from the captive nut base adjustment device specifically disclosed herein may be made. For example, a square rather than hexagonal nut may be used. Although the nut preferably fits closely in the space defined by vertical member 8, reinforcing plate 10, and retainer web 6c in order to align the hole of the nut automatically with the hole in the flange and retainer, the device can be designed so that the nut only touches one of these surfaces to prevent its rotation, in which case some manual alignment of the nut is necessary. Although the nut is preferably located above the flange, many of the benefits of the invention can be realized in a device in which the nut is located against the underside of the base beam flange and held there by a retainer similar to retainer 6 having one of its plates locked to a vertical member, either above or below the horizontal flange. Various other modifications will occur to those skilled in the art and may be made without departing from the scope of the invention as defined in the following claims.

I claim:

1. In an article of furniture, a height and leveling adjuster comprising:

a base beam rigidly secured to the article of furniture, the base beam having a horizontal flange with upper and lower surfaces and a hole extending vertically through the flange from the upper to the lower surface;

a nut having a threaded hole aligned with the hole in the flange;

a retainer having two substantially parallel plates held in rigid, spaced relationship to each other and having a hole in each of the parallel plates, the plates being situated on opposite sides of the flange of the base beam and the holes in the parallel plates being aligned with each other and with the hole in the horizontal flange, one of the two substantially parallel plates lying against one of the upper and lower surfaces of the horizontal flange, and the nut fitting in a space between the other of the upper and lower surfaces and the other of the two substantially parallel plates;

a foot having a threaded shank extending through all three of said holes and threaded into the nut: and cooperating means on the retainer and base beam preventing removal of the retainer from the base beam while the nut is situated in said space, but permitting removal of the retainer from the base beam when the nut is not present in said space.

2. In an article of furniture, a height and leveling adjuster according to claim 1 wherein said nut is captively held in a snug fashion.

3. In an article of furniture, a height and leveling adjuster according to claim 1 wherein said nut is situated on the upper surface of the flange between the flange and one of the two substantially parallel plates, and the other of said two substantially parallel plates is in contact with the lower surface of the flange.

4. In an article of furniture, a height and leveling adjuster according to claim 1 wherein said base beam further comprises a vertical member and said cooperating means comprises a slot in said vertical member having a wide portion located near said flange and a narrow portion located remote from said flange, and one of the two substantially parallel plates has a narrow neck portion capable of extending through said narrow portion of said slot, and a wide portion capable of passing through said wide portion of said slot but incapable of passing through said narrow portion of said slot.

5. In an article of furniture, a height and leveling adjuster according to claim 4, wherein said slot in said vertical member is substantially L-shaped; and said one of the two substantially parallel plates on said retainer is substantially T-shaped.

6. In an article of furniture, a height and leveling adjuster according to claim 4, wherein said vertical member extends upwardly from said flange.

7. In an article of furniture, a height and leveling adjuster according to claim 1, wherein said threaded shank of said foot further comprises a slot at an end thereof for receiving a screwdriver.

8. In an article of furniture, a height and leveling adjuster according to claim 1, wherein said retainer is substantially C-shaped, and further comprises a web for connecting the two substantially parallel plates and for extending around said flange.

9. In an article of furniture, a height and leveling adjuster according to claim 1 wherein said base beam and retainer have means presenting two spaced, opposed surfaces and a third surface extending transverse to said spaced opposed surfaces, whereby the spaced, opposed surfaces and the third surface together form a pocket for receiving the nut and positioning the nut with its threaded hole aligned with the hole in said flange.

10. In an article of furniture, a height and leveling adjuster according to claim 9 wherein said nut has vertically opposed parallel side surfaces, and said horizontal flange has a width substantially equal to the distance between said opposed side surfaces of said nut; said nut fitting into said pocket such that when said nut contacts against said third surface said hole of the nut is automatically aligned with said hole of the horizontal flange, and said opposing side surfaces of said nut are respectively in contact with the base beam and the retainer to prevent rotation of the nut.

* * * * *